Aug. 17, 1937.     J. C. HEINTZ     2,090,256
TIRE RETREADING METHOD AND PRODUCT
Filed June 17, 1936
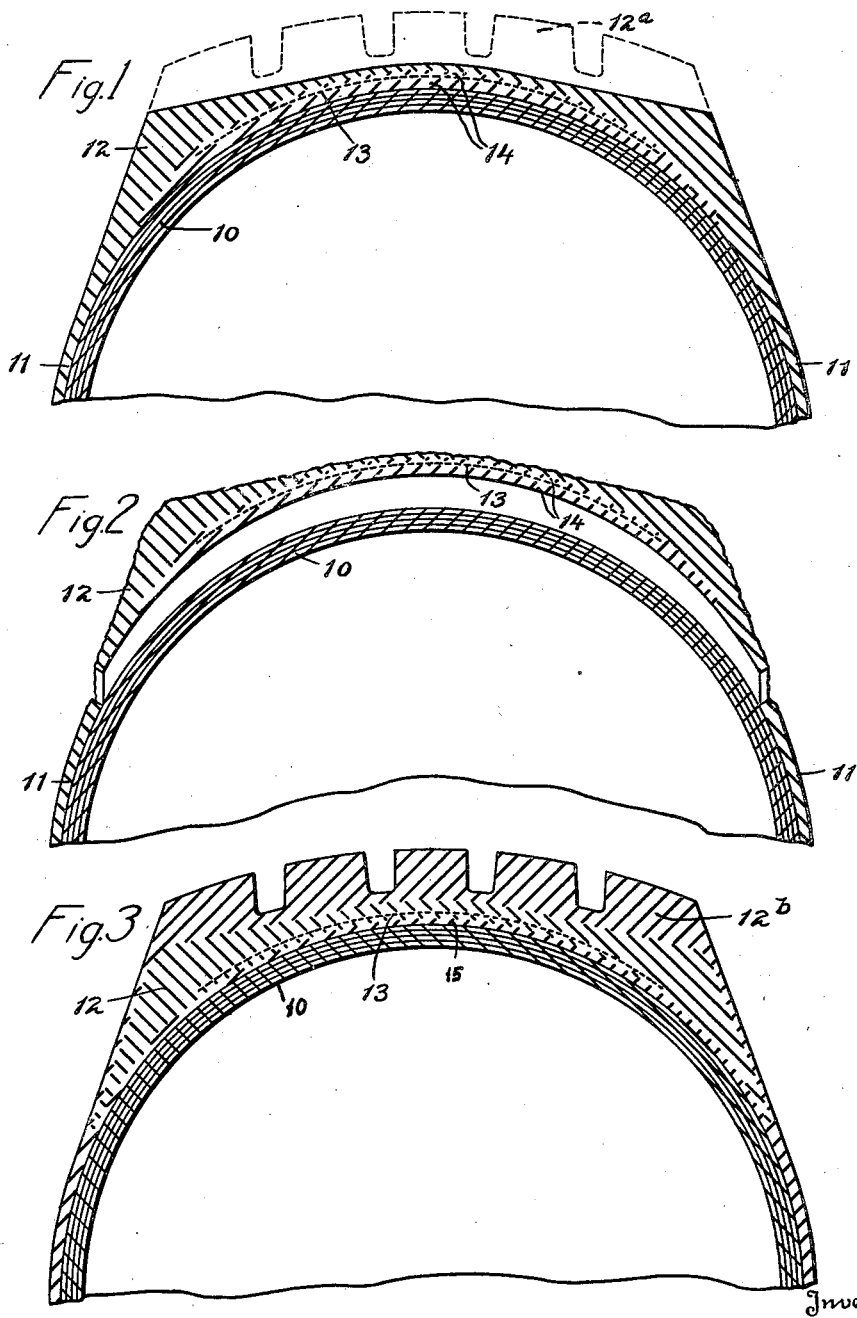
Inventor,
J. C. Heintz,
By Robert M. Pierson,
Attorney Patented Aug. 17, 1937

2,090,256

UNITED STATES PATENT OFFICE 2,090,256

TIRE RETREADING METHOD AND PRODUCT

James C. Heintz, Lakewood, Ohio

Application June 17, 1936, Serial No. 85,675

6 Claims. (Cl. 154—14)

This invention, which relates to the full-circle retreading of worn pneumatic tires, has for its object an improved method and product according to which a worn tread may be partially replaced and restored to its original or any desired volume, the disadvantages of certain prior methods avoided, and perfect adhesion to the carcass obtained, with a considerable saving of material and reduction in cost of the retreading operation.

Of the accompanying drawing, Fig. 1 is a partial cross-sectional view of a pneumatic tire casing having its tread so far worn off that its retreading is desirable.

Fig. 2 is a similar view showing the tread band stripped from the carcass in accordance with my invention.

Fig. 3 is a similar view showing the tire retreaded according to my invention.

Prior to this invention, two principal modes of applying a full-circle retread to a tire have been commonly used. According to the first method, the partially worn tread, including fabric breaker strip or strips if any, is completely removed between the shoulders, exposing the outer ply of carcass fabric, the carcass is roughened and coated with rubber cement in the exposed zone thereof, a complete new tread band of rubber composition, generally including a breaker strip embedded in cushion rubber, is applied around the cemented carcass and the new tread is vulcanized in place upon the carcass. By suitably shaping the retreading mold, the tread is formed with a non-skid design, and the finished work has practically the appearance of a new tire. In this method, the old tread is completely wasted except for its scrap value. According to the second method, known as "recapping", the old tread is merely buffed down somewhat and cemented and a shallow addition of rubber composition is built up and vulcanized on the old tread, usually with a non-skid design consisting merely of parallel circumferential ribs. This recapping method is less expensive and uses a smaller amount of material, but the retread mileage will often be low because of a possible undiscovered defect in an outer carcass ply or plies, or imperfect adhesion between the old tread and the carcass, which remains undiscovered because of non-removal of the old tread.

My present invention combines the advantages and avoids the disadvantages of these respective old methods, in that it utilizes the rubber of the partly worn original tread but involves the preliminary removal of the old tread, allowing inspection of the outer side of the carcass and performance of any outside repairs which may be required thereon, followed by a rebuilding of the removed tread to the desired thickness, and coating of its inner side, with vulcanizable rubber composition, so that perfect adhesion upon the cemented carcass may be obtained in finally vulcanizing the built-up tread upon the carcass in a full-circle mold.

In the drawing, 10 is the crown portion of the carcass of a pneumatic tire casing, composed of the usual plies of rubberized cord fabric, 11 is the outer side wall rubber and 12 is the rubber tread underlaid with an open-fabric breaker strip 13 embedded in cushion rubber 14 next to the carcass. By broken lines in Fig. 1, the outer portion 12ª of the tread is represented as worn off to a depth below the recesses between the non-skid ribs or blocks, leaving the remaining tread smooth.

The first step is preferably a buffing or rasping of the old tread to roughen its surface for good adhesion of the new rubber composition to be added on the outside, as now practiced in the aforesaid capping method. This buffing, which may be carried over the side edges, removes a little of the old rubber, leaving the outer surface approximately in the condition shown in Fig. 2.

The next step is to strip the old tread, with the breaker and cushion rubber, from the carcass between the shoulders of the tire casing, preferably as an endless band, leaving it separated from the carcass and from the side-wall rubber as shown in Fig. 2, and thereupon easily removable from the carcass. This step may be performed by any suitable detreading means, such as a known chuck machine employing a blunt-pointed hand pin or rod, whereby the stripping operation is very quickly performed.

On removal of the tread band 12, the outer side of the carcass is exposed for the detection of any shallow cuts, thread breaks or other injuries which might not be discernible from the inside and which, if found, may thereupon be repaired. Such removal provides a bare zone of carcass surface on which good adhesion of new rubber may be obtained.

The exposed zone of bare carcass may now be lightly buffed and coated with rubber cement, upon which is applied a thin layer 15 of vulcanizable cushion rubber, shown in Fig. 3, or said layer could be applied to the inner surface of the old tread band on reversing the band, said inner surface in either case preferably being buffed, and also cemented if desired. The old cushion layer 14, which is hatched or shaded oppositely to the body of the tread in Figs. 1 and 2, is not distinguished from the rest of the old tread rubber in Fig. 3. The new cushion layer 15 is preferably made somewhat wider than the old, in the interest of avoiding separation from the carcass, and may be of the full width of the old tread band.

The worn band is now adhered to the exposed bare carcass, with the cushion layer intervening, and rolled down thereon, the outer side of said band may be cemented and is then built up with wearing rubber composition 12b, using the ordinary retread "camelback" in a thinner layer than for a complete new tread, and to such a depth as will restore to the composite tread substantially the volume of the original tread if desired. The added outer rubber may omit the edges of the old tread and be caused to flow around it by the heat and molding pressure of vulcanization, thinly covering said edges as shown in Fig. 3, or some of it may be applied to the edges before placing in the mold.

The retreaded tire casing is finally cured or vulcanized in the usual manner in a suitable mold, the new rubber of the tread will integrally unite with the old without overcuring the latter when proper materials and curing time and temperature are employed, the tread will firmly unite with the carcass and with the old side rubber 11, and the old tread will act as a core in the new rubber of the composite tread, which is distinguished from the old in Fig. 3 by opposite hatching.

The original tread rubber is deeper at the edges than in the middle, and the same relation remains in the worn tread, so the volume of new rubber displaced by using the old tread is very considerable. Allowing for the small added labor cost, the net cost of a retreading operation is substantially lowered by the use of this invention, because of the saving of material, as compared with full-depth retreading with new rubber, and the average retread mileage is higher than with the "capping" method.

It will be understood that variations in the above-described procedure, such as using in the composite retread a worn tread band of a proper size removed from a tire casing other than that which is being retreaded, may be practiced without departing from the principle of the invention.

I claim:

1. The method of tire repairing which comprises completely enclosing a body of old vulcanized rubber with vulcanizable rubber in a composite repair body, and vulcanizing said composite body upon a tire.

2. The method of tire retreading which comprises applying, in a full circle, to a used tire, a cushion layer of unvulcanized rubber, applying old vulcanized rubber in strip form around said cushion layer, and applying an outer wearing tread layer of unvulcanized rubber around said layer of old rubber, to make a composite tread band, and vulcanizing the three rubbers in the band together and upon the tire.

3. The method of retreading which comprises stripping a worn tread from a pneumatic tire, rebuilding said tread on both its inner and outer sides with vulcanizable rubber composition, including an external wearing tread layer, and vulcanizing the rebuilt tread upon a carcass.

4. The method of retreading which comprises stripping a worn vulcanized tread as an endless band from a pneumatic tire carcass between the shoulders, leaving the side-wall rubber in place, adding vulcanizable wearing rubber on the outer side and cushion rubber on the inner side of said band to restore its volume, adhering the composite band to the stripped zone of a carcass, and vulcanizing said band upon the carcass and to the old side rubber.

5. A retreaded pneumatic tire comprising a carcass having a rebuilt rubber tread vulcanized thereon and composed of a core of previously vulcanized rubber, and a covering of additional rubber composition on both outer and inner surfaces of said core, including external wearing tread rubber, integrally united therewith by vulcanization.

6. A retreaded tire according to claim 5 in which the core is an original worn rubber tread.

JAMES C. HEINTZ.